UNITED STATES PATENT OFFICE.

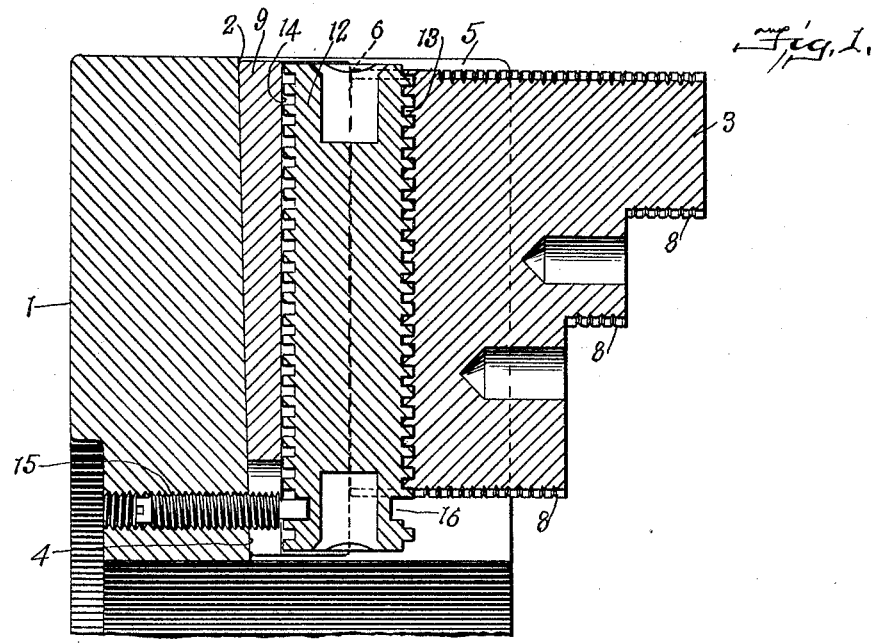
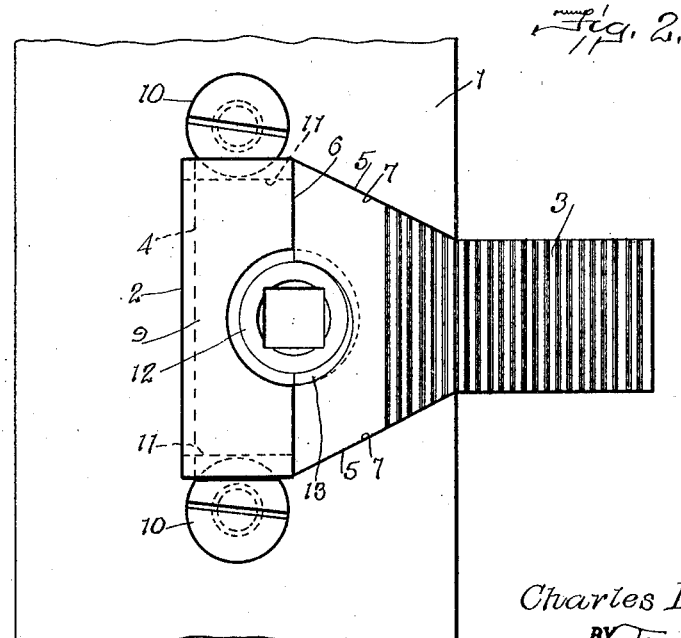

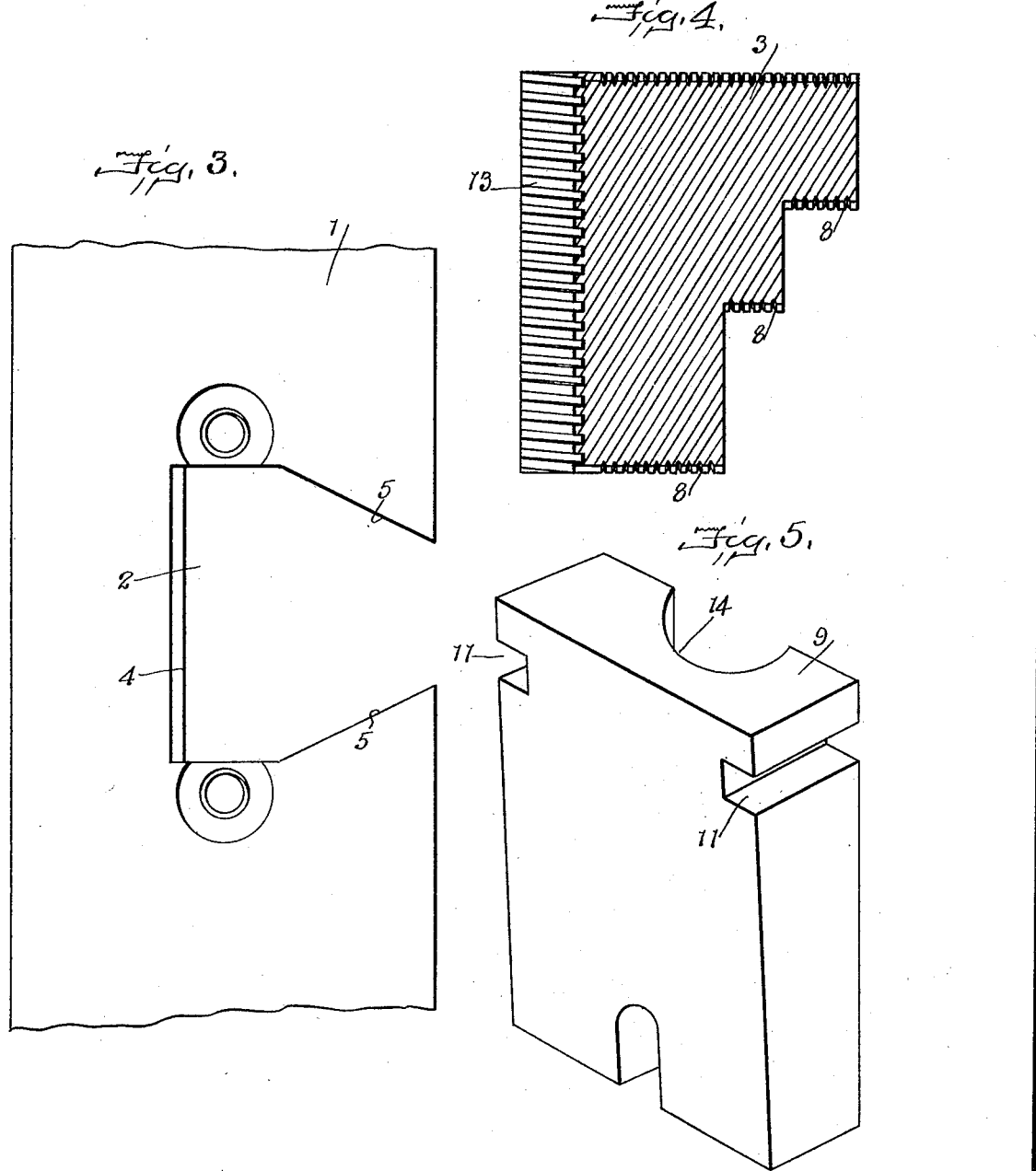

CHARLES F. SWISSGABEL, OF DAYTON, OHIO.

CHUCK.

1,401,207.   Specification of Letters Patent.   Patented Dec. 27, 1921.

Application filed February 18, 1920. Serial No. 359,738.

*To all whom it may concern:*

Be it known that I, CHARLES F. SWISSGABEL, a citizen of the United States, residing at Dayton, in the county of Montgomery and State of Ohio, have invented certain new and useful Improvements in Chucks, of which the following is a specification, reference being had therein to the accompanying drawing.

This invention relates to improved chucks, or similar devices and has for its object to provide means in chucks of this character to compensate for wear of the chuck jaws and grooves so that adjustment of the jaws may be maintained normal indefinitely.

It is well known in the trades in which chucks of the usual types are used that the chuck jaws and the grooves or ways in which the jaws operate become worn in time to such extent that the jaws lose their alinement relative to each other and the chuck body, therefore their effectiveness in holding and alining the work supported thereby will be destroyed, or impaired to such extent that the chucks will be rendered useless for accurate work.

In chucks of ordinary construction no provision is made to compensate for wear of the jaws and ways. Therefore when these parts become worn to any considerable extent it is necessary to discard the chucks where accurate work is required. This involves considerable expense as the cost of the chucks is relatively high. Thus with the provision made in the present invention to adjust the jaws to compensate for wear the working life of the chucks is prolonged indefinitely, material economies being thereby effected in replacement costs.

A further advantage derived from the present invention consists in the lower cost at which the improved chucks can be produced, the chucks of any given size being lighter and relatively stronger, and requiring less and cheaper machining operations in their manufacture. Furthermore the chuck jaws and grooves are less subject to breakage than chucks of ordinary construction.

In the accompanying drawings:

Figure 1 is a sectional view taken longitudinally through a chuck jaw and groove and a portion of the chuck body embodying my invention;

Fig. 2 is a detail end view of the chuck jaw and the adjusting mechanism;

Fig. 3 is a detail of the chuck groove with the jaw removed therefrom;

Fig. 4 is a detail of the chuck jaw and

Fig. 5 is a detail of the tapered key or wedge for adjusting the jaws.

The invention may be applied to any suitable form of chuck body. As here shown a chuck body 1 of the usual construction is employed having any suitable number of channels or grooves 2 formed therein to receive the jaws 3; the lower portion of the channel being rectangular shaped in cross dimension the bottom 4 being inclined upwardly toward the center of the chuck and the upper opposite walls 5 of the channel being inclined toward each other, the bottom of the channel being substantially wider than the top.

That part of the chuck jaw coöperating with the channel is shaped in cross-section to fit the upper portion of the groove, thus the jaw consists of a lower portion 6 having outwardly inclined working surfaces 7 adapted to engage the inclined walls 5 of the groove 2, the upper portion of the jaw extending above the face of the chuck and being provided in the usual manner with stepped gripping jaws 8.

As above stated the bottom of the groove 2 is inclined upwardly toward the center of the chuck. An adjusting wedge 9, tapered on the bottom side thereof from its outer to its inner end to conform to the angle of the inclined bottom 4, is fitted into the lower portion of the groove 2; thus the upper face of the wedge will be substantially parallel with the bottom of the jaw and in working contact therewith.

The wedge 9 is adjustable longitudinally in the groove 2 by means of adjusting screws 10 which are secured in the body of the chuck adjacent the outer end of the wedge 9, having their heads sunk below the peripheral surface of the chuck and in engagement with slots 11 formed in the opposite edges of the wedge. Thus by adjusting the screws the wedge will be moved longitudinally toward or away from the center of the chuck, and the chuck jaw will be raised or lowered accordingly relative to the face of the chuck; when the screws are adjusted inwardly the wedge will be moved inwardly toward the center of the chuck and the jaw will be raised; and when the screws are adjusted outwardly the wedge will be moved outwardly and the jaw will be lowered, the extent of adjustment in either direction being determined by the amount of movement imparted to the wedge.

Thus it will be seen that wear of the chuck jaws and grooves can readily be compensated for by adjusting the screws to move the wedge inwardly, and the jaws may be eased in the grooves or removed therefrom by adjusting the screws to move the wedge outwardly.

The jaws 3 are adjusted longitudinally in the grooves 2 by threaded bolts or screws 12, the bottom of the jaw 3 having a semi-circular, threaded depression 13 formed therein to coöperate with the screw 12 to effect the adjustment, and the upper face of the wedge as here shown having a semi-circular clearance depression 14 formed therein to receive the lower portion of the screw. Longitudinal movement of the screw is prevented by means of a threaded lock or retaining stud 15 secured in the body of the chuck and coöperating with an annular groove 16 formed in the screw 12 near its inner end. Thus, by rotating the screw the chuck jaws may be adjusted in either direction as desired. To remove the jaw and adjusting screw the stud 15 is disengaged from the groove 16, the wedge is moved outwardly to ease the jaw, the screw and jaw may then be withdrawn from the chuck.

While the construction here shown is in a preferred form, various modifications may be made in the details of construction and arrangement without departing from the underlying principle of the invention as defined and comprehended in the various combinations of construction of the appended claims.

Having thus fully described my invention, what I claim as new and desire to secure by Letters Patent, is:—

1. The combination with a chuck body, of a groove in said body having upwardly and inwardly inclined walls and the bottom thereof inclined upwardly toward the center of the chuck, a jaw operable in said groove and having opposite inclined surfaces coöperating with the inclined surfaces of the groove, and an adjusting member interposed between the bottom of the groove and said jaw and tapered to conform with the inclination of the bottom of the groove, and means to adjust said member longitudinally to raise or lower the jaw relative to the bottom of the groove.

2. The combination with a chuck body, of a groove in said body having its bottom thereof inclined upwardly toward the center of the chuck, a jaw operable in said groove, means to retain the jaw in working relation with the groove, an adjusting member interposed between the bottom of the groove and said jaw and tapered to conform with the inclination of the bottom of the groove, means to adjust the jaw radially of the chuck body and means to adjust said member longitudinally to raise or lower the jaw relative to the bottom of the groove.

3. The combination with a chuck body, of an undercut groove in said body, a jaw operable in said groove, an adjusting member interposed between the bottom of the groove and the jaw whereby the jaw may be raised or lowered relative to the bottom of the groove, and means for adjusting said jaw longitudinally in said groove.

4. The combination with a chuck body, of an undercut groove in said body, a jaw operable in said groove, a member interposed between the bottom of the groove and the jaw and adjustable longitudinally in said groove whereby the jaw may be raised or lowered relative to the bottom of the groove and means independent of said member to effect adjustment of said jaw longitudinally in said groove.

5. The combination with a chuck body, of an undercut groove in said body, a jaw operable in said groove and a member interposed between the bottom of the groove and the jaw and adjustable longitudinally in said groove whereby the jaw may be raised or lowered relative to the bottom of the groove and means interposed between the jaw and said member to move the jaw longitudinally in said groove.

6. The combination with a chuck body, of an undercut groove in said body having the bottom thereof inclined upwardly toward the center of the chuck, a jaw mounted for adjustment longitudinally in said groove, a wedge tapered to conform to the inclination of the bottom of the groove and interposed between the bottom and said jaw to effect wear compensating adjustment of the latter, and an adjusting screw secured in said body whereby said wedge may be moved longitudinally in said groove to raise or lower the jaw relative to the bottom of the groove.

7. The combination with a chuck body, of an undercut groove in said body having the bottom thereof inclined upwardly toward the center of the chuck, a jaw operable in said groove, a wedge tapered to conform to the inclination of the bottom of the groove and interposed between the bottom and said jaw and an adjusting screw secured in said body whereby said wedge may be moved longitudinally in said groove to raise or lower the jaw relative to the bottom of the groove, and an adjusting screw interposed between the wedge and the jaw to move the jaw longitudinally in the groove.

8. The combination with a chuck body, of an undercut groove in said body, a jaw mounted for adjustment in one direction in the groove, and an adjusting member interposed between the chuck body and said jaw to compensate for loose movement of the jaw in another direction.

9. The combination with a chuck body, of an undercut groove, a jaw having a threaded depression, a jaw adjusting member interposed between the bottom of the groove and the jaw and having a clearance depression and arranged to compensate for lateral displacement of the jaw, and a jaw adjusting member operable in said depressions.

10. The combination with a chuck body, a groove in said body having undercut working surfaces, a jaw operable in said groove and having angularly working surfaces cooperating with the working surfaces of the groove, and an angular adjusting member interposed between the bottom of the groove and said jaw to compensate for wear between said surfaces.

11. In combination, a chuck body member, a jaw member, an undercut groove in one of said members, a projecting portion provided on the other member and slidably engaging the groove, a member interposed between the bottom of said groove and said projecting portion and adjustable longitudinally in said groove whereby the jaw may be raised or lowered relatively to the bottom of the groove, and means for adjusting said projecting portion longitudinally in said groove.

In testimony whereof, I affix my signature.

CHARLES F. SWISSGABEL.